July 16, 1963     S. LUTSKER     3,097,428
PIPE CUTTER
Filed Sept. 7, 1961
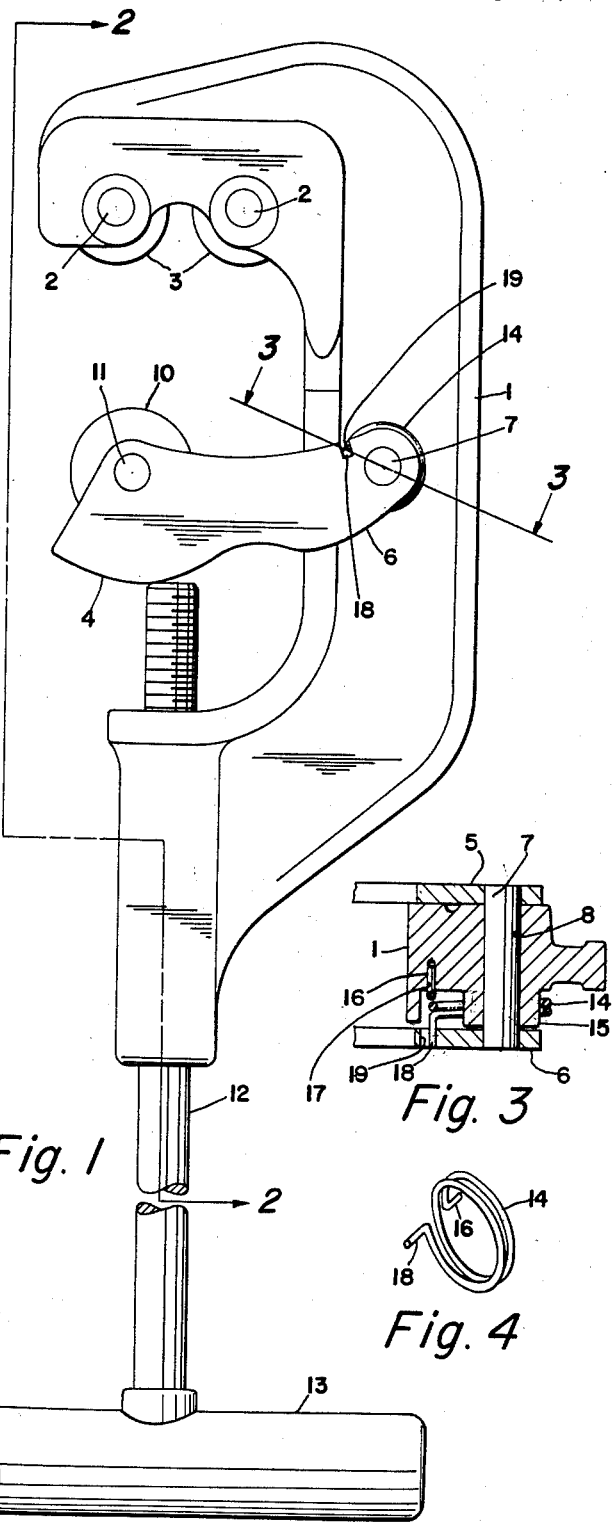
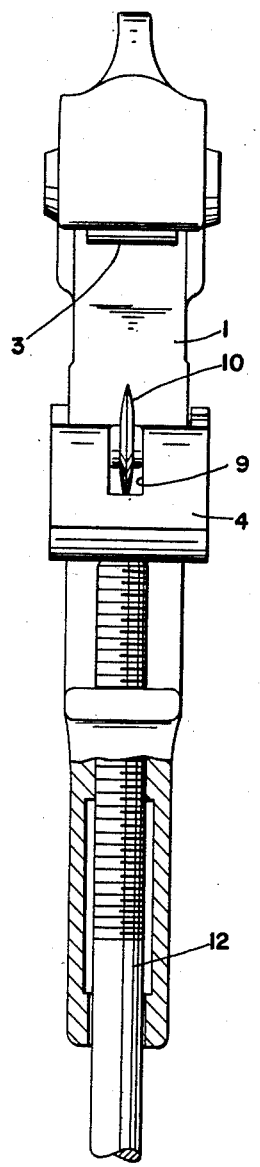
Fig. 1
Fig. 3
Fig. 4
Fig. 2
INVENTOR.
SIMON LUTSKER
BY
*Isler & Ornstein*
ATTORNEYS 3,097,428
PIPE CUTTER
Simon Lutsker, 3120 Belvoir Blvd., Shaker Heights, Ohio
Filed Sept. 7, 1961, Ser. No. 136,541
1 Claim. (Cl. 30—102)

This invention relates generally to pipe cutters, but has reference more particularly to improvements in pipe cutters of the type in which a cutter-wheel carrying arm is usually provided, which is pivotally connected to a C-shaped frame which carries the rollers of the cutter, this arm being actuated toward the rollers of the cutter by means of a screw threadedly mounted on the frame and provided with a handle for rotating the screw.

In cutters of the aforesaid type, when the screw is retracted to any extent, the aforesaid arm is free to move about its pivotal mounting, so that the cutter wheel can easily move into contact with the rollers, thereby causing possible injury or damage to both the cutter wheel and rollers.

The invention accordingly has as its primary object the provision of means for preventing the cutter wheel from coming into contact with the rollers at such times when the pipe cutter is not in use, or is being handled preparatory to a pipe-cutting operation.

Another object of the invention is to provide a pipe cutter of the character described, which is provided with means for resiliently maintaining the cutter-wheel carrying arm out of contact with the rollers and for maintaining the arm against the end of the screw which actuates the arm.

A further object of the invention is to provide a spring for the aforesaid purpose which is so constructed and so mounted with reference to other parts of the cutter as to be effectively concealed and protected against dislodgement or unauthorized removal from the cutter.

Other objects and advantages of my invention will be apparent during the course of the following description.

In the accompanying drawings forming a part of this specification, and in which like numerals are employed to designate like parts throughout the same, FIG. 1 is a side elevational view of a pipe cutter embodying the invention;

FIG. 2 is a view, partly in elevation, and partly in section, of the cutter, as indicated by the line 2—2 of FIG. 1;

FIG. 3 is a fragmentary cross-sectional view, taken on the line 3—3 of FIG. 1, and FIG. 4 is a perspective view of the coil spring shown in FIGS. 1 and 3.

Referring more particularly to the drawings, a pipe cutter of the type referred to is shown, comprising a C-shaped frame 1, having a pair of spaced pins 2 rigidly mounted on its forward end, and upon which hardened steel or malleable iron rollers 3 are revolubly mounted.

The pipe cutter also includes an arm or lever 4, having furcations 5 and 6 extending therefrom, which straddle the frame 1 and are pivotally connected to the ends of a pin 7, which is rigidly mounted in an opening 8 of the frame 1, whereby the arm or lever 4 is pivotally movable about the axis of the pin 7.

The arm or lever 4 is provided in its forward end with a recess 9, in which a hardened steel cutter wheel 10 is disposed, this cutter wheel being revoluble about a pin 11 which is rigidly mounted in the arm or lever.

For pipe-cutting operations, the arm or lever 4 is adapted to be moved about its pivotal mounting towards the rollers 3, and for this purpose a screw 12 is provided, which extends through the frame 1 and is threadedly mounted in said frame, as clearly shown in FIG. 2. The end of the screw 12 bears against the lower cam-like surface of the arm 4, as shown in FIGS. 1 and 2. The screw 12 is provided with a handle 13 for rotating the screw.

For the purpose of preventing the cutter wheel from coming into contact with the rollers at such times when the pipe cutter is not in use, or is being handled preparatory to a pipe-cutting operation, I have provided a coil spring 14, which is mounted on a hub-like extension 15 of the frame 1, and has one end 16 extending into an aperture 17 in the side of the frame 1, and its other end 18 extending into a recess 19 in the furcation 6 of the arm or lever 4.

The coil spring 14 thus resiliently maintains the cutter-wheel carrying arm, and thus the cutter wheel, out of contact with the rollers 3 and maintains the arm 4 at all times against the end of the screw 12, so that the arm is always in readiness to be actuated by the screw.

Moreover, the coil spring 14 is so constructed, and so mounted with reference to the frame 1 and the arm 4 as to be effectively concealed by and protected by these parts, and cannot be dislodged or removed from the pipe cutter without removing the pin 7 and disconnecting the arm 4 from the frame 1.

It is to be understood that the form of my invention, herewith shown and described, is to be taken as a preferred example of the same, and that various changes may be made in the shape, size and arrangement of parts thereof, without departing from the spirit of the invention or the scope of the subjoined claim.

Having thus described my invention, I claim:

In a pipe cutter, a generally C-shaped frame having a roller carrying terminal end and an opposite end provided with a threaded bore having its axis disposed normally to the roller carrying terminal end, a screw threaded element mounted in threaded engagement with said bore and movable toward and away from said roller carrying end, a hub formed on said frame generally medially of the terminal ends, a pin extending through said hub, a pivoted arm having a bifurcated end mounted on said pin and straddling said hub, said arm extending into the opening between the terminal ends of the frame, said threaded element bearing against said arm for moving said arm toward and away from said roller, cutter means rotatably journalled on said arm at the free end thereof and movable therewith toward and away from said roller carrying end, a coiled torsion spring surrounding said hub, a recess in the frame adjacent said hub and receiving one end of said spring, a recess in said arm receiving the opposite end of said spring, said spring acting between said hub and said arm to bias said arm continuously into yielding contact with said threaded element whereby movement of said threaded element defines the spacing between said cutter and the roller carrying terminal end of the frame.

References Cited in the file of this patent
UNITED STATES PATENTS

| 234,689 | Saunders | Nov. 23, 1880 |
| 801,866 | Headson | Oct. 17, 1905 |
| 1,376,936 | Heristone | May 3, 1921 |
| 2,283,572 | Petersen | May 19, 1942 |